United States Patent
Lincoln, III

(10) Patent No.: US 9,944,344 B1
(45) Date of Patent: Apr. 17, 2018

(54) KIT FOR PAIRING TWO BICYCLES

(71) Applicant: Frank E. Lincoln, III, Glen Burnie, MD (US)

(72) Inventor: Frank E. Lincoln, III, Glen Burnie, MD (US)

(*) Notice: Subject to any disclaimer, the term of this patent is extended or adjusted under 35 U.S.C. 154(b) by 38 days.

(21) Appl. No.: 15/162,683

(22) Filed: May 24, 2016

Related U.S. Application Data

(60) Provisional application No. 62/230,379, filed on Jun. 5, 2015.

(51) Int. Cl.
*B62K 13/06* (2006.01)
*B62K 21/00* (2006.01)

(52) U.S. Cl.
CPC .............. *B62K 13/06* (2013.01); *B62K 21/00* (2013.01)

(58) Field of Classification Search
CPC ................................. B62K 13/06; B62K 21/00
USPC ....................................................... 280/209
See application file for complete search history.

(56) References Cited

U.S. PATENT DOCUMENTS

| | | | | | |
|---|---|---|---|---|---|
| 2,768,834 | A | * | 10/1956 | Wilson | A63H 33/107 280/259 |
| 3,592,486 | A | * | 7/1971 | Fox | B62K 3/12 280/209 |
| 4,290,620 | A | * | 9/1981 | Chika | B60G 21/055 280/209 |
| 2002/0014755 | A1 | * | 2/2002 | Black | B62K 3/005 280/231 |

* cited by examiner

*Primary Examiner* — Jacob D Knutson
*Assistant Examiner* — Felicia L. Brittman
(74) *Attorney, Agent, or Firm* — Kyle A. Fletcher, Esq.

(57) ABSTRACT

The kit for pairing two bicycles includes a rear angle member, a seat-to-seat tube member, a pair of head-to-head tube members, and a tie-bar. The rear angle is adapted to attach between chain stays of a first bicycle and a second bicycle. The seat-to-seat tube member is adapted to attach to seat posts of the first bicycle and the second bicycle. The pair of head-to-head tube members is adapted to extend between the head tubes of the first bicycle and the second bicycle. The tie-bar is adapted to attach to a fork of the first bicycle and the second bicycle in order to provide consistent steering when in use. When installed, the kit securely aligns the first bicycle parallel with the second bicycle such that both bicycles ride and move in unison.

9 Claims, 5 Drawing Sheets

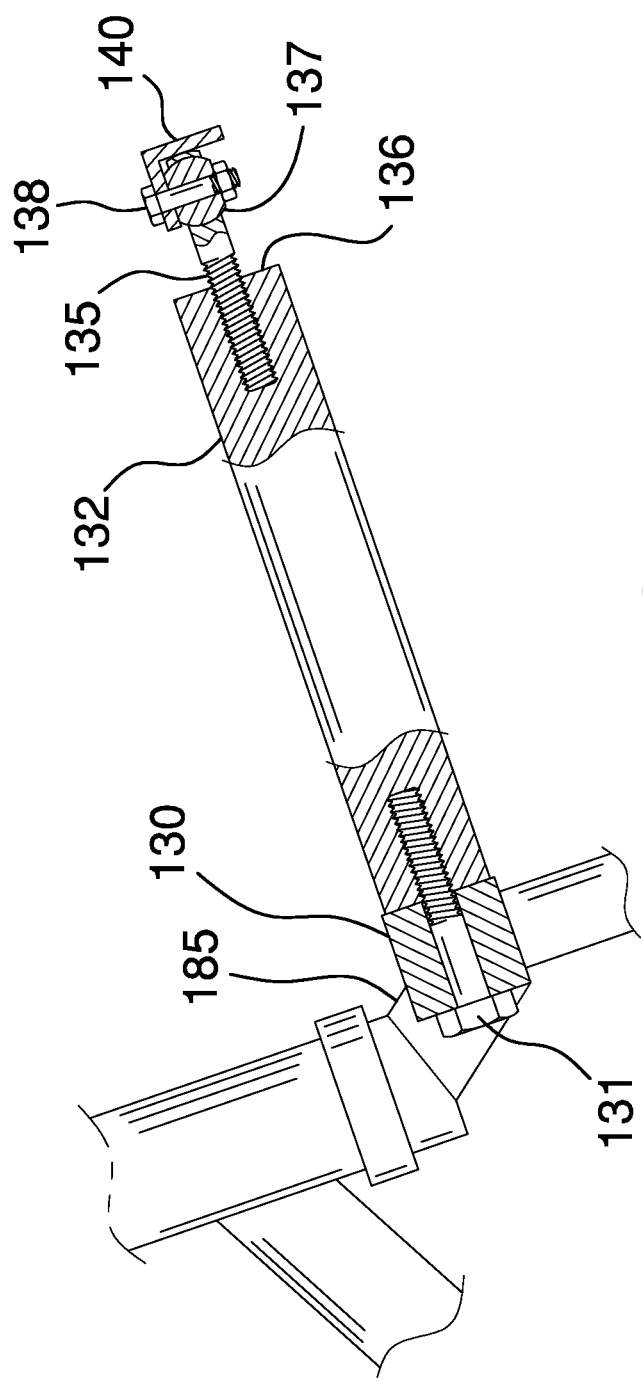

KIT FOR PAIRING TWO BICYCLES

CROSS REFERENCES TO RELATED APPLICATIONS

This non-provisional patent application claims priority to provisional application 62/230,379 filed on Jun. 5, 2015.

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of bicycles, more specifically, a kit that enables two bicycles to be paired together in a side-by-side arrangement.

SUMMARY OF INVENTION

The kit for pairing two bicycles includes a rear angle member, a seat-to-seat tube member, a pair of head-to-head tube members, and a tie-bar. The rear angle is adapted to attach between chain stays of a first bicycle and a second bicycle. The seat-to-seat tube member is adapted to attach to seat posts of the first bicycle and the second bicycle. The pair of head-to-head tube members is adapted to extend between the head tubes of the first bicycle and the second bicycle. The tie-bar is adapted to attach to a fork of the first bicycle and the second bicycle in order to provide consistent steering when in use. When installed, the kit securely aligns the first bicycle parallel with the second bicycle such that both bicycles ride and move in unison.

An object of the invention is for a kit to be installed onto two bicycles in order for both bicycles to ride and move in unison.

A further object of the invention is for the kit to attach between two bicycles such that both bicycles are parallel with one another.

A further object of the invention is for the kit to attach to forks of the front wheel of both bicycles to insure steering of both bicycles is in unison.

These together with additional objects, features and advantages of the kit for pairing two bicycles will be readily apparent to those of ordinary skill in the art upon reading the following detailed description of the presently preferred, but nonetheless illustrative, embodiments when taken in conjunction with the accompanying drawings.

In this respect, before explaining the current embodiments of the kit for pairing two bicycles in detail, it is to be understood that the kit for pairing two bicycles is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the kit for pairing two bicycles.

It is therefore important that the claims be regarded as including such equivalent construction insofar as they do not depart from the spirit and scope of the kit for pairing two bicycles. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

FIG. 5 is a cross-sectional view of an embodiment of the disclosure in use across line 5-5 in FIG. 4.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
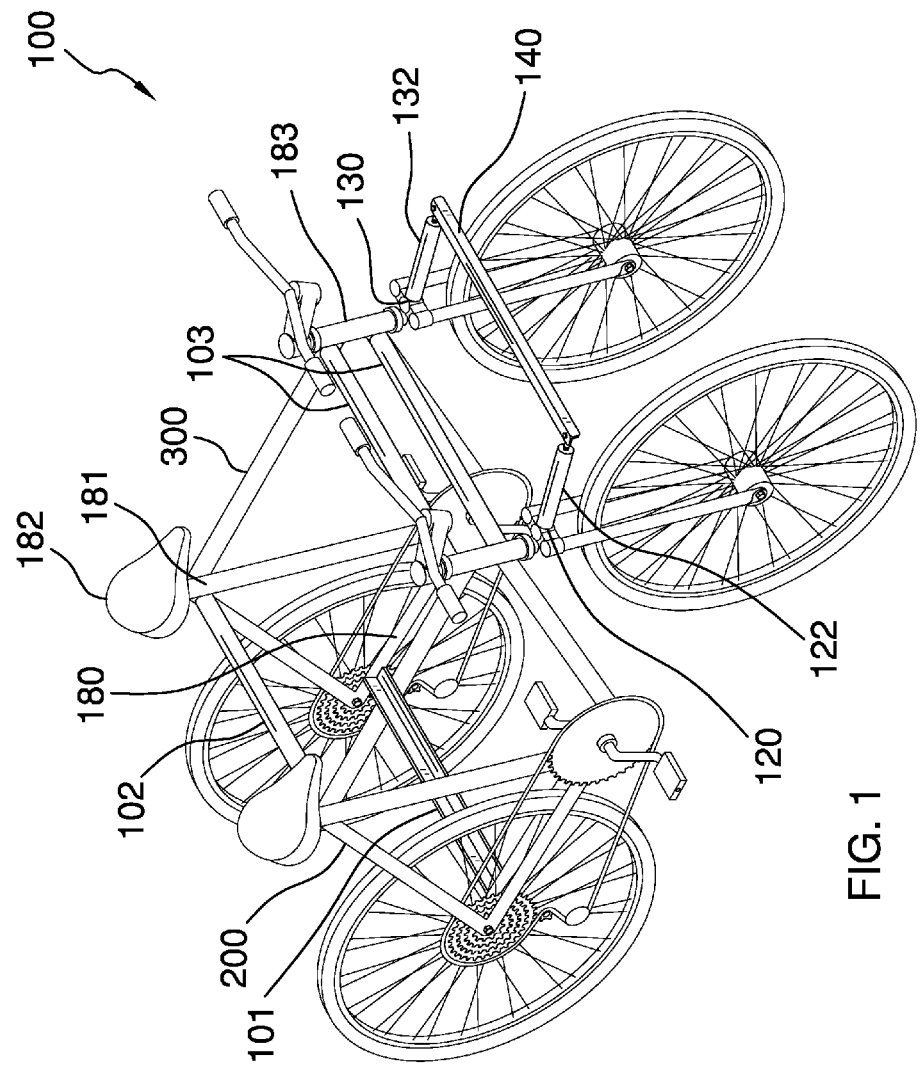
FIG. 1 is a perspective view of an embodiment of the disclosure in use.
Figure 2:
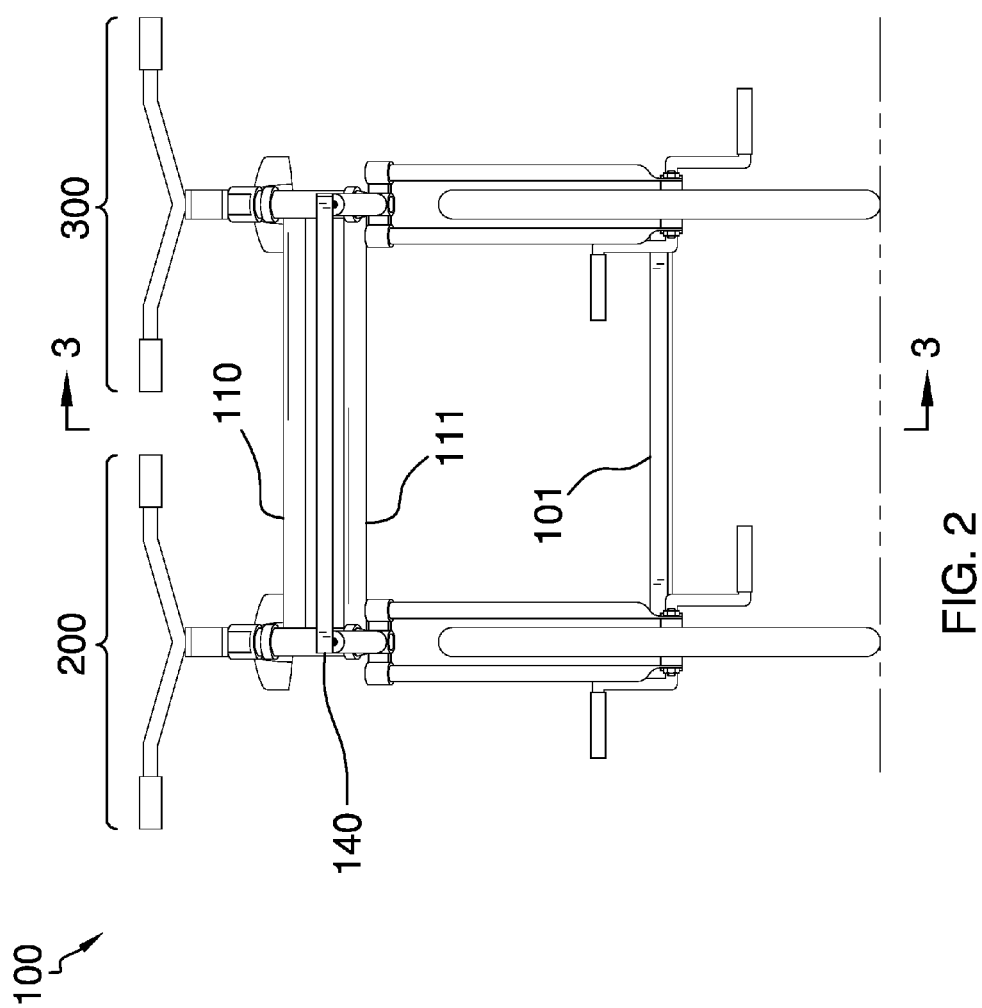
FIG. 2 is a front view of an embodiment of the disclosure in use.
Figure 3:
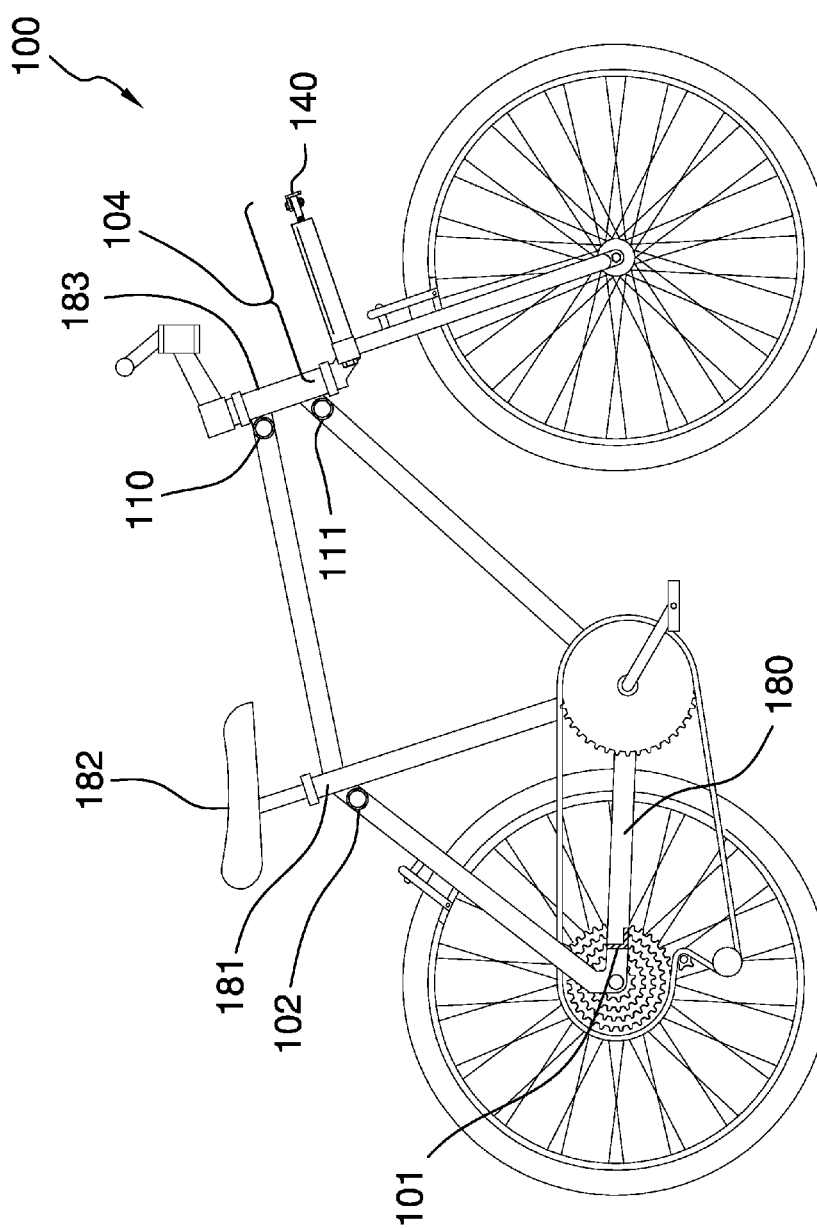
FIG. 3 is a side view of an embodiment of the disclosure in use.
Figure 4:
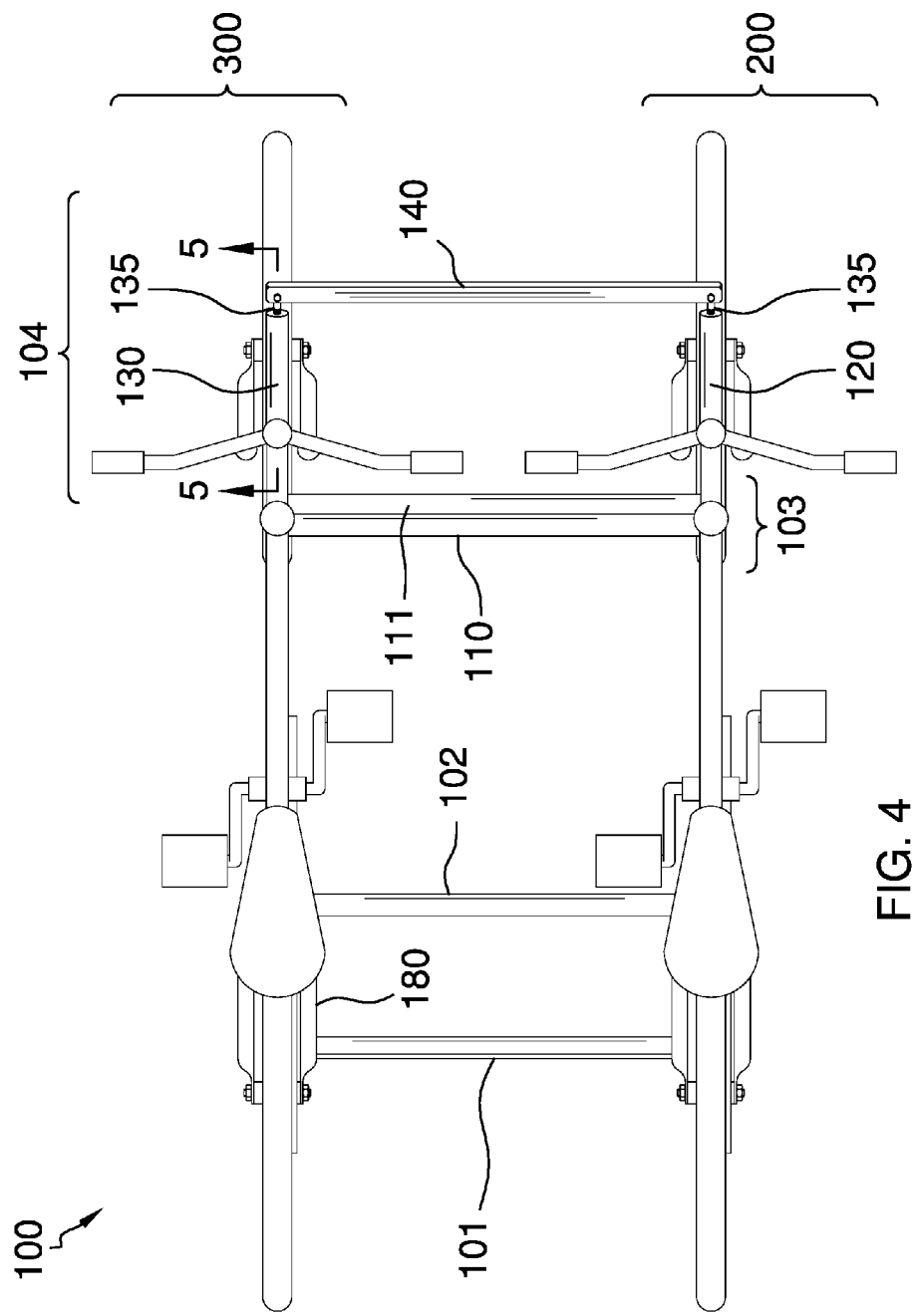
FIG. 4 is a top view of an embodiment of the disclosure in use.

Detailed reference will now be made to one or more potential embodiments of the disclosure, which are illustrated in FIGS. 1 through 6. The kit for pairing two bicycles (hereinafter 100) is a device that is adapted to be installed onto a first bicycle 200 and a second bicycle 300 such that the first bicycle 200 and the second bicycle 300 ride in unison. The invention 100 includes a rear angle member 101, a seat-to-seat tube member 102, a pair of head-to-head tube members 103, and a tie bar 104.

The rear angle member 101 is adapted to attach between chain stays of the first bicycle 200 and the second bicycle 300. The rear angle member 101 may be a piece of angle iron, and is ideally welded to the chain stays 180 of both the first bicycle 200 and the second bicycle 300.

The seat-to-seat tube member 102 is a tube that is adapted to attach adjacent to seat posts 181 of the first bicycle 200 and the second bicycle 300. The seat-to-seat tube member 102 is rigidly affixed just behind the seat posts 181 via welding. The seat-to-seat tube member 102 is adapted to be positioned just behind seats 182 of the first bicycle 200 and the second bicycle 300.

The pair of head-to-head tube members 103 is adapted to extend between head tubes 183 of the first bicycle 200 and the second bicycle 300. The pair of head-to-head tube members 103 is further defined with a top tube 110 and a bottom tube 111. The top tube 110 is parallel with and above the bottom tube 111. Both the top tube 110 and the bottom tube 111 are welded to the head tubes 183 of the first bicycle 200 and the second bicycle 300.

The tie-bar 104 is adapted to attach to a fork 185 of the first bicycle 200 and the second bicycle 300 in order to provide consistent steering when in use. The tie bar 104 is adapted to engage the fork 185 of the first bicycle 200 and the second bicycle 300 in order to provide consistent steering of both the first bicycle 200 and the second bicycle 300. Without the tie bar 104, the first bicycle 200 would be able to steer independent of the second bicycle 300, and which would in all likelihood result in a crash.

Referring to FIG. 5, the tie-bar 104 is further defined with a first collar 120 and a second collar 130. It shall be noted that the first bicycle 200 is assigned to the first collar 120 and the second bicycle 300 is assigned to the second collar 130. Both the first collar 120 and the second collar 130 interface where the fork 185 splits.

The first collar 120 is attached via a first bolt 121 to a first tie-post 122. The second collar 130 is attached via a second bolt 131 to a second tie-post 132. Both the first tie-post 122 and the second tie-post 132 extends forward in a direction of the first bicycle 200 as well as the second bicycle 300, respectively. Both the first tie-post 122 and the second tie-post 132 are pivotably attached to a tie-bar cross member 140. The tie-bar cross member 140 spans across the first bicycle 200 and the second bicycle 300. Referring to FIG. 5, both the first tie-post 122 and the second tie-post 132 have a cross bolt 135 affixed to a distal end 136. The cross bolt 135 includes a cross bearing 137 that interfaces with a second cross bolt and nut 138. The second cross bolt and nut 138 is affixed to the tie-bar cross member 140 and enables rotational movement between the tie-bar cross member 140 and the first tie-post 122 as well as the second tie-post 132.

When installed, the invention 100 securely aligns the first bicycle 200 parallel with the second bicycle 300 such that both first bicycle 200 and the second bicycle 300 ride and move in unison.

With respect to the above description, it is to be realized that the optimum dimensional relationship for the various components of the invention described above and in FIGS. 1 through 5, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A dual bicycle assembly comprising:
   a rear angle member that attaches between a first bicycle and a second bicycle such that the first bicycle and the second bicycle are parallel with one another;
   wherein the rear angle member attaches between chain stays of the first bicycle and the second bicycle;
   wherein the rear angle member is a piece of angle iron, and is welded to the chain stay of both the first bicycle and the second bicycle;
   wherein a seat-to-seat tube member is a tube that attaches adjacent to the seat posts of the first bicycle and the second bicycle;
   wherein the seat-to-seat tube member is rigidly affixed just behind the seat posts via welding;
   wherein the seat-to-seat tube member is positioned just behind the seats of the first bicycle and the second bicycle;
   wherein a pair of head-to-head tube members extends between the head tubes of the first bicycle and the second bicycle;
   wherein the pair of head-to-head tube members is further defined with a top tube and a bottom tube;
   wherein the top tube is parallel with and above the bottom tube;
   wherein both the top tube and the bottom tube are welded to the head tubes of the first bicycle and the second bicycle.

2. The dual bicycle assembly according to claim 1 wherein a tie-bar attaches to a fork of the first bicycle and the second bicycle in order to provide consistent steering when in use.

3. The dual bicycle assembly according to claim 2 wherein the tie-bar is further defined with a first collar and a second collar.

4. The dual bicycle assembly according to claim 3 wherein the first collar is affixed to the first bicycle; wherein the second collar is affixed to the second bicycle; wherein both the first collar and the second collar interface where the fork splits on the first bicycle and the second bicycle, respectively.

5. The dual bicycle assembly according to claim 4 wherein the first collar is attached via a first bolt to a first tie-post.

6. The dual bicycle assembly according to claim 5 wherein the second collar is attached via a second bolt to a second tie-post.

7. The dual bicycle assembly according to claim 6 wherein both the first tie-post and the second tie-post extends forward in a direction of the first bicycle as well as the second bicycle, respectively; wherein both the first tie-post and the second tie-post are pivotably attached to a tie-bar cross member.

8. The dual bicycle assembly according to claim 7 wherein the tie-bar cross member spans across the first bicycle and the second bicycle; wherein both the first tie-post and the second tie-post have a cross bolt affixed to a distal end.

9. The dual bicycle assembly according to claim 8 wherein the cross bolt includes a cross bearing that interfaces with a second cross bolt and nut; wherein the second cross bolt and nut is affixed to the tie-bar cross member and enables rotational movement between the tie-bar cross member and the first tie-post as well as the second tie-post.

\* \* \* \* \*